Nov. 19, 1963  R. S. SILVER  3,111,462
METHOD FOR OPERATING A MULTI-STAGE FLASH DISTILLATION SYSTEM
Filed Sept. 19, 1958
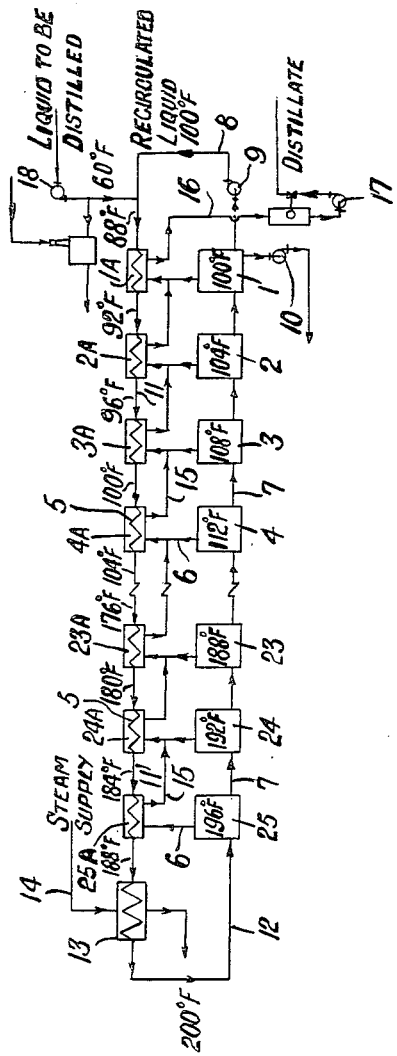

3,111,462
METHOD FOR OPERATING A MULTI-STAGE FLASH DISTILLATION SYSTEM
Robert S. Silver, Cathcart, Glasgow, Scotland, assignor to G. & J. Weir Limited, Glasgow, Scotland, a corporation of Great Britain and Northern Ireland
Filed Sept. 19, 1958, Ser. No. 762,068
Claims priority, application Great Britain Sept. 21, 1957
1 Claim. (Cl. 202—53)

This invention relates to an improved multiple-stage evaporator of the type in which liquid at saturation temperature corresponding to the pressure in the chamber (hereinafter referred to as "flash chamber") of one stage flows to the flash chamber of a further stage at a lower pressure and arrives in said further stage at a temperature higher than the saturation temperature corresponding to the lower pressure so that a portion of the liquid flashes into vapour which is led off to condensing means where the vapour is obtained as a liquid distillate.

It is to be understood that, in an evaporator of the type referred to, there is a vapour system in which vapour is condensed and flows as a distillate in one direction through a plurality of stages and a liquid system in which feed liquid, which may be brine, flows together with recirculated liquid in the opposite direction through a plurality of stages. In the following description, we enumerate the stages in accordance with the sequence of heating liquid flowing through the system, the first stage being that in which liquid flowing through the system is first heated by vapour from the vapour system and the last stage being that in which the liquid, after flowing through a plurality of stages in series with the first stage, is finally heated by vapour from the vapour system.

The primary object of the present invention is to provide for a reduction in the heating surface required in each stage for a given make of distillate.

In an evaporator of the type referred to, the provision of a plurality of stages for flash of liquid into vapour permits an economy in the amount of heat to be supplied to the evaporator. Such an economy is defined usually in terms of the "performance ratio" of the evaporator which, in an evaporator producing distilled water and using steam as the primary source of heat, is the ratio of the number of pounds of distillate produced to the number of pounds of steam used for heating the water, and is so used herein and in the appended claim. In general, an evaporator having $n$ stages has a performance ratio slightly less than $n$. For example, an evaporator with two stages would have a performance ratio of about 1.8, with three stages a performance ratio of about 2.6, with four stages a performance ratio of about 3.3, and with eight stages a performance ratio of about 6. Thus, the number of stages is only slightly greater than the performance ratio.

In an evaporator, of the type referred to, according to the invention I provide a plurality of stages the number of which is an integer greater than at least twice the performance ratio of the evaporator. For example, if the desired performance ratio is to be 2.6, I provide an evaporator having at least six stages. If the ratio is to be six I provide an evaporator having at least thirteen stages.

I have discovered that, when the number of stages is related to the performance ratio as stated above, the temperature at which vapour is available for regenerative heating is increased and a considerable saving is effected in the heating surface required in each stage.

The following is an example of an evaporator according to my invention:

I provide an evaporator having a performance ratio of 7.3 with a drop in temperature of liquid flowing through the evaporator from 200° F. to 100° F. If the evaporator had only ten stages, vapour would be available at temperatures of 190° F., 180° F., 170° F. . . . 100° F. In order to obtain the desired performance ratio of 7.3, liquid to be recirculated through the evaporator would require to be heated initially to a temperature of 188° F. and finally by steam, to a temperature of 200° F., so that the difference between the temperature of the vapour in the tenth stage and the initial temperature of the liquid to be recirculated would be 190° F.—188° F.=2° F. The heating surface in each stage would have to be sufficiently large for the evaporator to operate at this low temperature difference.

In an evaporator of the type referred to according to my invention, in which the performance ratio will be maintained at 7.3, there will, however, be at least twenty-five stages as illustrated in the accompanying flow diagram.

Referring to the diagram, in which only stages one to four and twenty-three to twenty-five have been shown for clarity, 1, 2, 3, 4, 23, 24 and 25 denote, respectively, the flash chambers of the first four stages and of the last three stages. 1A, 2A, 3A, 4A, 23A, 24A and 25A denote, respectively, vapour chambers associated with each flash chamber and including a heater denoted generally by 5, presenting a heating surface for heating by vapour of feed liquid, such as brine, and of liquid being recirculated through the stages and flowing through the heater.

In operation of the system, vapour condensed in each vapour chamber flows as a distillate in the direction from the vapour chamber 25A to the chamber 1A and liquid flows in the opposite direction through the heater 5 in the vapour chamber 1A to the heater 5 in the vapour chamber 25A and thence to the flash chamber 25.

Each flash chamber 25 to 1 is connected by a duct 6 to its associated vapour chamber and each chamber 25 to 2 is connected by a duct 7 to its succeeding chamber. The chamber 1 is connected by a duct 8 in which is intercalated a pump 9 to the heater 5 in the vapour chamber 1A. A pump 10 for blowdown of liquid from the flash chamber 1 is connected to the chamber 1.

The heater 5 in each of the vapour chambers 2A to 25A is connected by a duct 11 to the heater 5 in the preceding vapour chamber. The heater 5 in the vapour chamber 25A is also connected by a duct 12 to the flash chamber 25. A heater 13 fed with stream by way of a duct 14 from a source of supply of steam is intercalated in the duct 12 to heat liquid leaving the heater 5 in the vapour chamber 25A to a temperature of 200° F. Each vapour chamber 25A to 2A is connected to its succeeding vapour chamber by a duct 15 for flow of distillate through the chamber. The vapour chamber 1A is connected by a duct 16 to a pump 17 for extraction of the complete distillate from the evaporator.

In the evaporator shown in the diagram the performance ratio is 7.3 and the drop in temperature of the liquid is from 200° F. to 100° F., so that the twenty-five stages will provide a drop in temperature of $100/25 = 4°$ F., i.e., vapour will be available at 196° F., 192° F., 188° F. . . . 100° F. The initial temperature of the liquid to be recirculated is 100° F., but the difference in temperature between vapour in the twenty-fifth stage and the temperature to which the liquid being circulated is to be heated by the vapour in said stage will be 196° F.—188° F.=8° F.

This relatively large temperature difference permits the use of a smaller heating surface in the heater in each vapour chamber than was possible heretofore. It will be understood that, with a performance ratio of 7.3, the greater the number of stages in excess of twenty-five, the greater will be the temperature difference between the temperature of vapour in the last stage and the temperature to which liquid is to be heated in said last stage.

In practice, liquid such as brine, to be distilled is fed at a temperature of 60° F. by a pump 18 to the duct 8 where it mixes with liquid being recirculated and flows at an initial temperature of 88° F. through the twenty-five stages of the evaporator. While flowing through the stages, liquid at saturation temperature corresponding to the pressure in the flash chamber, for example, 25, of one stage flows through the duct 7 to the flash chamber 24 of the succeeding stage at a lower temperature and arrives in the chamber 24 at a temperature higher than the saturation temperature corresponding to the lower pressure in said chamber 24, so that a portion of the liquid flashes into vapour which flows through the duct 6 to the vapour chamber 24A where the vapour heats liquid flowing through the associated heater 5, is condensed and flows as liquid distillate through the duct 15 to the succeeding vapour chamber 23A.

I claim:

In the method of evaporating liquids in and operating an evaporator having a preselected performance ratio number and including a multiplicity of evaporating zones arranged in series, in which each evaporating zone includes a flash zone and a condensing zone for condensing the vapor flashed from the liquid in the flash zone, the improvement which comprises providing a number of evaporating zones in series in the evaporator which is an integer greater than at least twice the performance ratio number selected for the evaporator, conducting the liquid to be vaporized through a heating zone to bring it to a vaporizing temperature and then in succession through the flash zones of the series of evaporating zones, maintaining the flash zones at progressively lower pressures in the direction of flow of the liquid to be vaporized, the evaporating zones being so interrelated that liquid at saturation temperature corresponding to the pressure in the flash zone of one evaporating zone flows to the flash zone of the next succeeding evaporating zone at a lower pressure and arrives in said next flash zone at a temperature higher than the saturation temperature corresponding to said lower pressure in said next flash zone so that a portion of the liquid flashes into vapor, conducting the vapor produced in each flash zone of an evaporating zone into the condensing zone thereof, and maintaining the vapors in the series of evaporating zones at progressively decreasing temperatures in the direction of flow of liquid through the flash zones of the evaporating zones.

References Cited in the file of this patent

UNITED STATES PATENTS

| | | |
|---|---|---|
| 643,702 | Waterhouse | Feb. 20, 1900 |
| 2,759,882 | Worthen | Aug. 21, 1956 |
| 2,908,618 | Bethon | Oct. 13, 1959 |

OTHER REFERENCES

Symposium on Saline Water Conversion, 1957, Office of Saline Water, U.S. Dept. of the Interior and National Academy of Sciences, National Research Council, publication 568 (pages 91–102, especially page 95).